United States Patent
Akaki et al.

(10) Patent No.: US 7,824,169 B2
(45) Date of Patent: Nov. 2, 2010

(54) STRETCHING APPARATUS FOR WEB OF THERMOPLASTIC SYNTHETIC RESIN

(75) Inventors: Kenichi Akaki, Kagawa-ken (JP); Yoshihiko Matsumoto, Kagawa-ken (JP)

(73) Assignee: Uni-Charm Corporation, Ehime (JP)

(*) Notice: Subject to any disclaimer, the term of this patent is extended or adjusted under 35 U.S.C. 154(b) by 84 days.

(21) Appl. No.: 12/307,826

(22) PCT Filed: Jun. 15, 2007

(86) PCT No.: PCT/JP2007/062105

§ 371 (c)(1),
(2), (4) Date: Feb. 26, 2009

(87) PCT Pub. No.: WO2008/010369

PCT Pub. Date: Jan. 24, 2008

(65) Prior Publication Data

US 2010/0015273 A1    Jan. 21, 2010

(30) Foreign Application Priority Data

Jul. 18, 2006  (JP) .............................. 2006-195825

(51) Int. Cl.
B29C 55/06    (2006.01)
(52) U.S. Cl. .................... 425/335; 264/288.4; 425/343; 425/363
(58) Field of Classification Search ................. 425/335, 425/340, 343, 363, 394; 264/280, 288.4, 264/288.8; 26/71; 156/229
See application file for complete search history.

(56) References Cited

U.S. PATENT DOCUMENTS 563,623 A    7/1896    Shedd (Continued)

FOREIGN PATENT DOCUMENTS

JP    60-26859 B2    6/1985

(Continued)

OTHER PUBLICATIONS

International Search Report of Application No. PCT/JP2007/062105 mailed Oct. 9, 2007.

*Primary Examiner*—James Mackey
(74) *Attorney, Agent, or Firm*—Lowe Hauptman Ham & Berner LLP (57) ABSTRACT

A stretching apparatus for thermoplastic synthetic resin improved so as to ensure that a web can be easily stretched over its entire width. The stretching apparatus 2 for a thermoplastic synthetic resin web 1 comprises a plurality of first stretching members L arranged in a circumferential direction on a peripheral surface of a drum 6 rotating in a machine direction M. The drum 6 is provided around its rotating shaft 8 with rotatable members 7 adapted to rotate in synchronization with the drum 6 in the direction in which the drum 6 rotates. The rotatable members 7 are respectively provided with a plurality of second stretching members U operatively associated with the first stretching members U. Surfaces of the first and second stretching members L, U associated with each other are defined by convex portions 31, 41 and concave portions 32, 42 extending in parallel to the shaft 8 and alternately arranged in the circumferential direction of the drum 6 in a complementary fashion to each other so that these surfaces of the first and second stretching members L, U configured in this manner may be engaged with and disengaged from each other. At least one of the first stretching member L and the second stretching member U is movable in the radial direction of the drum 6.

3 Claims, 10 Drawing Sheets

U.S. PATENT DOCUMENTS

| | | | |
|---|---|---|---|
| 3,849,526 A * | 11/1974 | Muller et al. | 264/286 |
| 4,223,059 A * | 9/1980 | Schwarz | 264/288.8 |
| 4,767,578 A * | 8/1988 | Thimon | 264/288.4 |
| 5,167,897 A | 12/1992 | Weber et al. | |
| 5,424,025 A * | 6/1995 | Hanschen et al. | 264/288.8 |
| 6,368,444 B1 * | 4/2002 | Jameson et al. | 264/288.8 |
| 6,706,228 B2 * | 3/2004 | Mackay | 264/288.8 |
| 6,991,758 B2 * | 1/2006 | Krumm et al. | 264/288.4 |
| 2002/0177827 A1 | 11/2002 | Noda et al. | |
| 2004/0121686 A1 | 6/2004 | Wong et al. | |
| 2006/0151914 A1 * | 7/2006 | Gerndt et al. | 425/363 |

FOREIGN PATENT DOCUMENTS

| | | |
|---|---|---|
| JP | 01-280059 | 11/1989 |
| JP | 01-292160 | 11/1989 |
| JP | 20052513723 A | 5/2002 |
| WO | 9956685 | 11/1999 |

* cited by examiner

STRETCHING APPARATUS FOR WEB OF THERMOPLASTIC SYNTHETIC RESIN

RELATED APPLICATIONS

The present application is based on International Application Number PCT/JP2007/062105 filed Jun. 15, 2007, and claims priority from, Japanese Application Number 2006-195825, filed Jul. 18, 2006, the disclosures of which are hereby incorporated by reference herein in their entirety.

TECHNICAL FIELD

The present invention relates to generally stretching apparatuses suitable for a web such as a fibrous assembly or film of thermoplastic synthetic resin.

RELATED ART

Conventionally there have already been proposed various methods and apparatuses adapted to feed a web such as a fibrous assembly or a film of thermoplastic synthetic resin in the machine direction and thereby to stretch the web of fibrous assembly or film in the machine direction.

For example, JP1985-26859B discloses an apparatus to stretch thermoplastic synthetic resin fiber web in the form of continuous nonwoven fabric. This apparatus utilizes a first intermeshing roller pair having grooves extending in parallel to the roller axes and a second intermeshing roller pair having grooves extending orthogonally to the roller axes to stretch the nonwoven fabric in the machine direction as well as in the cross direction. The peripheral surfaces of the respective rollers respectively present sinusoidal cross-sections in the direction which crossing their grooves.

JP2002-513723T also discloses a method and an apparatus to work on web being transported in a machine direction. The apparatus disclosed herein comprises a central disc and an outer disc both rotating in a direction in which the web is transported. The central disc has a peripheral surface and a pair of opposite end surfaces. At least one of the end surfaces is provided with a working tool and the outer disc is provided with a working tool configured to be complementary to the working tool of the central disc. These working tools being complementary to each other respectively have corrugated surfaces to define teeth adapted to be engaged with one another. Transversely middle region of the web is put in contact with the peripheral surface of the central disc and transversely lateral regions of the web are folded back onto the respective end surfaces of the central disc. The lateral regions folded back onto the respective end surfaces are sandwiched between the working tools being complementary to each other.

DISCLOSURE OF THE INVENTION

Problem to be Solved by the Invention

In the case of the apparatus disclosed in JP1985-26859B, the rollers in each pair are respectively formed on the peripheral surfaces with the sinusoidal grooves. The rollers in the pair adapted to stretch the nonwoven fabric in the machine direction are formed with the grooves extending in parallel to the axes. To increase a stretch ratio of the nonwoven fabric by this roller pair, a depth of the grooves may be increased, in other words, a height of crests describing the sinusoidal waves may be increased. To this end, diameters of the respective rollers must be enlarged to eliminate a problem that the crests of the rollers might interfere with one another during rotation of the roller pair. However, larger the diameters of the rollers, higher the expense required to produce such rollers. In addition, a time for which the rollers in the pair are in contact with each other is relatively short and therefore it is difficult to slow down a stretching rate of the web.

In the case of the apparatus disclosed in JP2002-513723T, the working tools which are complementary to each other are moved toward and apart from each other in the axial direction of the central disc and it is possible to slow down a rate of engagement between these two working tools and thereby to slow down a stretching rate of the web. However, it is difficult for this apparatus to stretch the middle region and the lateral regions of the web at the same stretch ratio, i.e., to stretch the web at a same stretch ratio over the entire width of the web. This is for the reason that the lateral regions of the web are folded back onto the respective end surfaces of the central disc and stretched on these end surfaces.

In view of the problem as has been described above, it is an object of the present invention to provide a stretching apparatus for a thermoplastic synthetic resin web improved so that the web can be easily stretched at the same stretch ratio over an entire width of the web.

Measure to Solve the Problem

According to the present invention, there is provided a apparatus adapted to a stretch web of thermoplastic synthetic resin on a peripheral surface of a drum rotating in a machine direction.

The apparatus according to the present invention comprises: the peripheral surface defined by a plurality of first stretching members arranged in a circumferential direction of the drum wherein the drum is provided around its rotating shaft with rotatable members adapted to rotate in synchronization with the drum and to be rotated in the direction in which the drum rotates; and the rotatable members provided with same number of second stretching members associated the first stretching members; wherein the first and second stretching members associated with one another have surfaces which are opposite to each other in a radial direction of the drum and defined by convex portions and concave portions extending in parallel to the shaft and alternately arranged in the circumferential direction of the drum in a complementary fashion to each other so that these surfaces of the first and second stretching members configured in this manner are able to be engaged with and disengaged from each other, and wherein at least one of the first stretching member and the second stretching member is movable in the radial direction so that these two members sandwiching the web are able to be engaged with each other.

According to one preferred embodiment of the present invention, an inlet nip roll pair adapted to introduce the web between the first and second stretching members is disposed on upstream side of the drum as viewed in the machine direction and an outlet nip roll pair adapted to discharge the web from between the first and second stretching members is disposed on downward side of the drum as viewed in the machine direction wherein circumferential velocities of these roll pairs and the drum are able to be successively increased in the order of the inlet nip roll pair, the drum and the outlet nip roll pair.

According to another preferred embodiment of the present invention, the first and second stretching members comprise flat-bottomed plates adapted to be parallel overlapped in engagement with each other.

EFFECT OF THE INVENTION

In an apparatus according to the present invention, a drum rotated in a machine direction has a peripheral surface which is defined by a plurality of first stretching members arranged in a circumferential direction of the drum, the drum is provided around its rotating shaft with rotatable members adapted to rotate in synchronization with the drum and the rotatable members are provided with the same number of second stretching members associated the first stretching members, and the first and second stretching members have surfaces which are opposite to each other in a radial direction of the drum and configured to be engaged with each other in the radial direction. In addition, at least one of the first stretching member and the second stretching member is movable in the radial direction so that the web may be introduced between these first and second stretching members and evenly stretched over its entire width as these first and second stretching members dimensioned larger than the width of the web come in engagement with each other.

According to the embodiment of the invention wherein the web runs in the machine direction under guiding effect of the inlet nip roll pair and the outlet nip roll pair, the circumferential velocity of the drum may be set to be higher than the circumferential velocity of the inlet nip roll pair to introduce the web between the first and second stretching members while the web is maintained in the state stretched in the machine direction. On the other hand, the circumferential velocity of the outlet nip roll pair may be set to be higher than the circumferential velocity of the drum to discharge the web having been stretched by the first and second stretching members in the machine direction without sagging.

According to the embodiment of the present invention wherein both the first and second stretching members are flat-bottomed type, these members are easily formed with the convex portions and the concave portions.

IDENTIFICATION OF REFERENCE NUMERALS USED IN THE DRAWINGS 1 web
2 apparatus
6 drum
7 rotatable member (plate assembly)
8 rotating shaft
13 inlet nip roll pair
16 outlet nip roll pair
31 convex portions
32 concave portions
41 convex portions
42 concave portions
L, $L_1$-$L_{12}$ first stretching member (sharply corrugated lower plates)
M machine direction
U, $U_1$-$U_{12}$ second stretching member (sharply corrugated upper plates)

DETAILED DESCRIPTION OF THE PREFERRED EMBODIMENTS

Details of a stretching apparatus according to the present invention for a thermoplastic synthetic resin web will be more fully understood from the description given hereunder with reference to the accompanying drawings.

Figure 1:
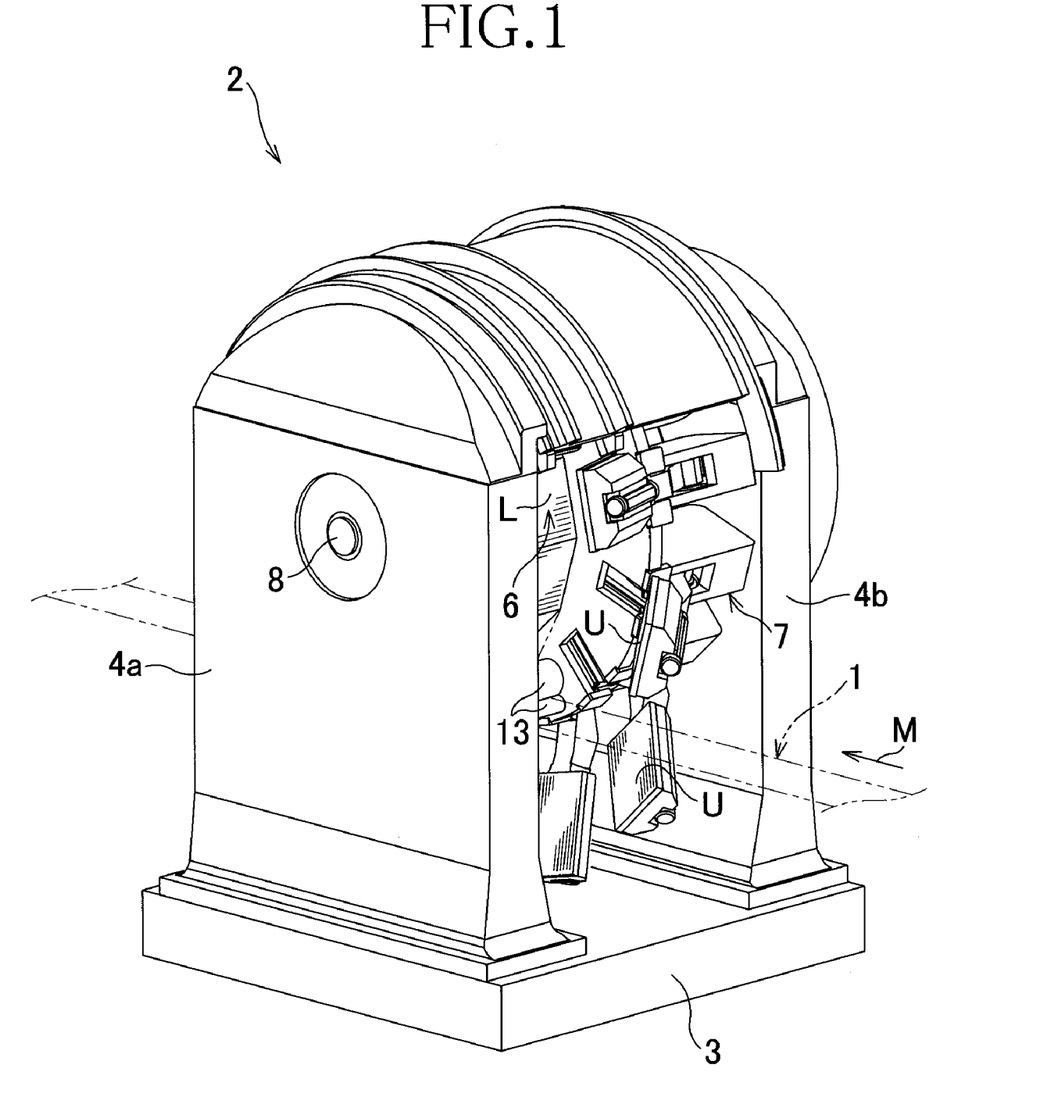
FIG. 1 A perspective view of the apparatus.
Figure 2:
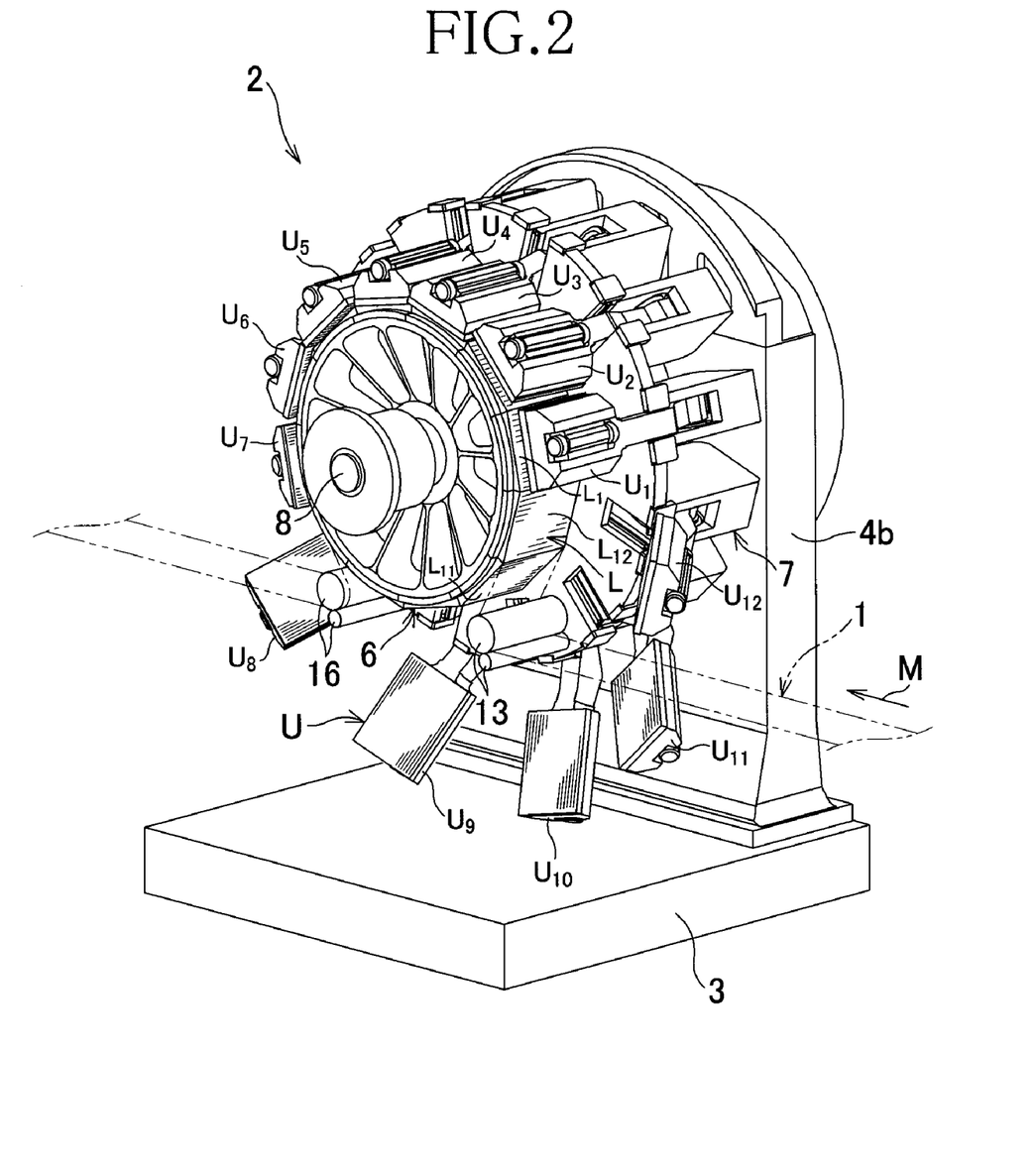
FIG. 2 A partially exploded perspective view of the apparatus.

FIGS. 1 and 2 respectively show a stretching apparatus 2 used for a fibrous web 1 indicated by imaginary lines in complete and partial perspective views. The apparatus 2 comprises a horizontal base 3 and a pair of supports 4a, 4b vertically extending from the base 3 and adapted to support a drum 6 and a plate assembly 7 by the intermediary of a shaft 8. It should be understood, however, that one of the supports 4a is illustrated in FIG. 2 to be removed from the base 3. Referring to FIG. 2, an apparatus direction with respect to the apparatus 2 is indicated by an arrow M and the drum 6 as well as the plate assembly 7 is rotated around or integrally with the shaft 8 supported by the supports 4a, 4b at the same circumferential velocity in the machine direction M as the web 1 is stretched. A peripheral surface of the drum 6 is defined by a plurality of sharply corrugated plates L serving as a first stretching member in the present invention. The plate assembly 7 comprises these sharply corrugated lower plates L and a plurality of sharply corrugated upper plates U operatively associated with these lower plates L so as to serve as a second stretching member in the present invention. Rotating in the machine direction M, the sharply corrugated upper plates U repetitively move closer to and apart from the sharply corrugated lower plates L. The web 1 is guided by a pair of the inlet nip roll pair 13 so as to be held in close contact with the sharply corrugated lower plates L and the sharply corrugated upper plates U come in engagement with these lower plates L (See FIG. 6) so as to stretch the web 1. After the sharply corrugated upper plates U has cooperated with the sharply corrugated lower plates L to stretch the web 1 and then has been disengaged apart from the lower plates L, the web 1 having been stretched in this manner is guided by a pair of the outlet nip roll pair 16 apart from the lower plates L and transported in the machine direction M. In this manner, the web 1 is stretched in the machine direction M within the apparatus 2 in the course of running in the machine direction M. The web 1 of elastically stretchable type is apt to restore its initial dimension after it has been once stretched within the apparatuses 2 while the web 1 of inelastically stretchable type is stabilized in a dimension longer than its initial dimension after it has been once stretched within the apparatus 2.

Figure 3:
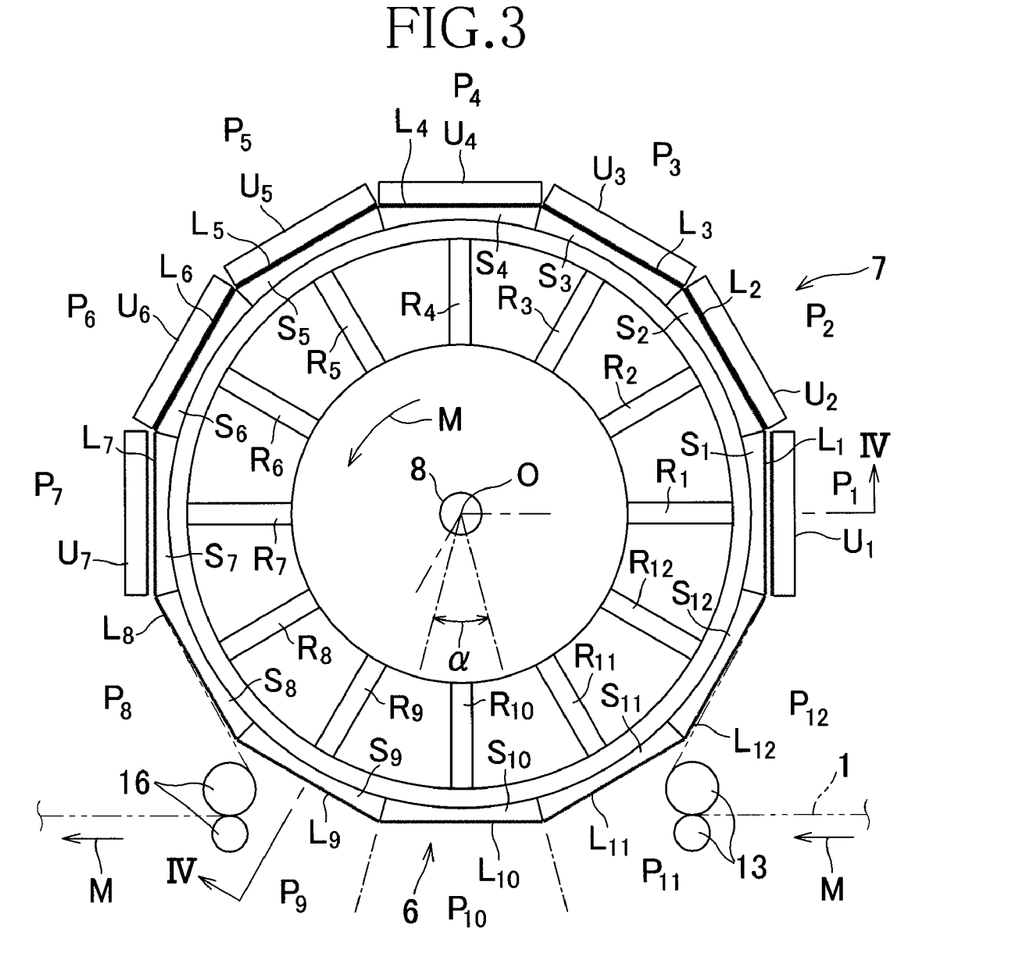
FIG. 3 A front view of the drum.
Figure 4:
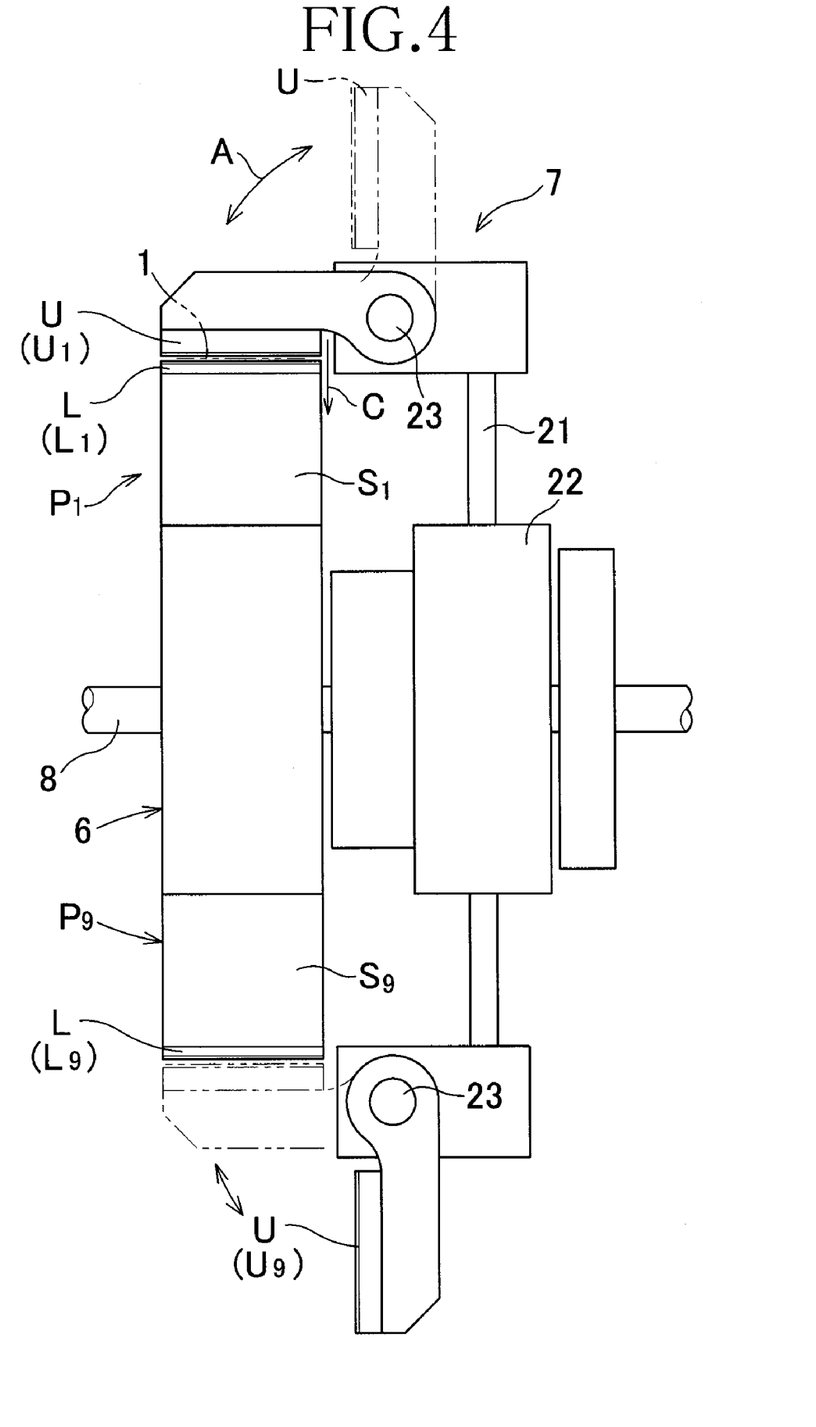
FIG. 4 A side view of the drum and the rotator.

FIGS. 3 and 4 are diagrams schematically illustrating movement of the drum 6 and the plate assembly 7 wherein FIG. 3 illustrates important parts of the drum 6 and the plate assembly 7 as viewed in an axial direction while FIG. 4 illustrates states of these drum 6 and plate assembly 7 in a sectional view taken along the line IV-IV in FIG. 3. Referring to FIG. 4, rotary rods 21 extending in a radial direction with respect to the shaft 8 are provided at distal ends thereof with the sharply corrugated upper plates U of the plate assembly 7.

Moving velocity of the rotary rods 21 in the radial direction can be controlled by utilizing a cam mechanism (not shown) contained within a control unit 22 provided around the shaft 8. In this way, the sharply corrugated plates U attached to the respective rotary rods 21 can be repetitively moved closely to and apart from the associated lower plates L at an intended velocity. The sharply corrugated upper plates U can be also swung around a pivot 23 in a double-headed arrow A. The movement of the sharply corrugated upper plates U closely to and apart from the associated sharply corrugated lower plates L as well as rotation thereof is synchronized with rotation of the drum 6. For example, one of the sharply corrugated upper plates U has rotated to the upper position in FIG. 4 at which this sharply corrugated upper plates U extends in parallel and opposite to the associated one of the sharply corrugated lower plates L with the web 1 interposed between them. On the other hand, the other sharply corrugated upper plate U which is shown at the bottom of FIG. 4 has rotated to the position at which is apart from the associated one of the sharply corrugated lower plates L. Then the upper plate U which is shown at the top of the FIG. 4 linearly moves radially inward with respect to the drum 6 as indicated by an arrow C until it comes in engagement with the associated lower plate L and thereby presses the web 1. Such movement is controlled by the associated rotary rod 21.

FIG. 3 illustrates a process in which the sharply corrugated upper plates U move closer to the associated sharply corrugated lower plates L into engagement with one another to stretch the web 1 interposed between them and thereafter move apart from the associated sharply corrugated lower plates L. The peripheral surface of the drum 6 is divided equally into twelve sections $S_1$-$S_{12}$ in the circumferential direction. These sections $S_1$-$S_{12}$ are respectively supported by associated spindles $R_1$-$R_{12}$ which extend radially in the radial direction from the shaft 8 while the sections $S_1$-$S_{12}$ respectively have the plates $L_1$-$L_{12}$ collectively referred to as the flat-bottomed sharply corrugated lower plates L. The individual sharply corrugated lower plates $L_1$-$L_{12}$ are flat-bottomed and continuously arranged in the circumferential direction of the drum 6 wherein each pair of adjacent lines extending from an axis O of the shaft 8 and circumferential opposite ends of the respective sharply corrugated lower plates $L_1$-$L_{12}$ include therebetween an angle $\alpha$ of 30° and each pair of the adjacent spindles R also include an angle of 30°. The sharply corrugated upper plates U are also flat-bottomed and comprise the sharply corrugated upper plates $U_1$-$U_{12}$ operatively associated with the corresponding sharply corrugated lower plates $L_1$-$L_{12}$. It should be appreciated that, in FIG. 3, the sharply corrugated upper plates $U_1$-$U_7$ are illustrated to extend in parallel to and overlap the associated sharply corrugated lower plates $L_1$-$L_7$ and the remaining sharply corrugated upper plates $U_8$-$U_{12}$ not illustrated therein are swinging apart from the associated sharply corrugated lower plates $L_8$-$L_{12}$ (See FIG. 2).

Figure 5:
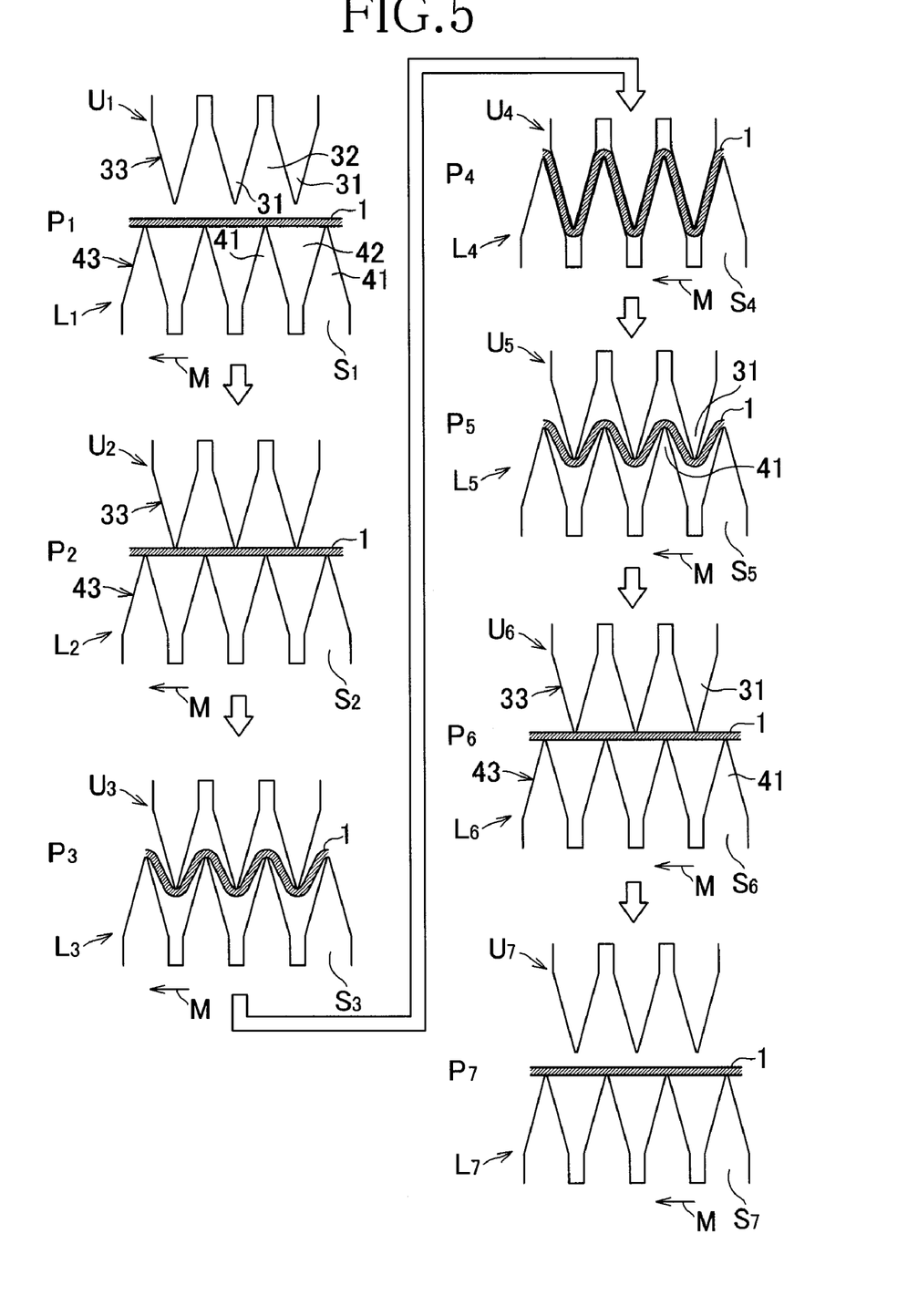
FIG. 5 A diagram illustrating movement of the sharply corrugated upper plate.

FIG. 5 is a partially scale-enlarged diagram of the sections $S_1$-$S_7$ of FIG. 3 illustrating successive movement of the sharply corrugated upper plates U. Each of the sharply corrugated upper plates U has a tooth-shaped surface 33 comprising upper convex portions 31 and upper concave portions 32 extending in the axial direction and alternately arranged in the circumferential direction of the drum 6. Similarly, each of the sharply corrugated lower plates L has a tooth-shaped surface 43 comprising lower convex portions 41 and lower concave portions 42 extending in the axial direction and alternately arranged in the circumferential direction of the drum 6. In the apparatus 2, the sharply corrugated upper plates U are adapted to overlap the associated sharply corrugated lower plates L in parallel as illustrated by FIG. 3-FIG. 5. The respective surfaces 33, 43 are configured in complementary relationship with each other so that the convex and concave portions of these two surfaces 33, 43 come in engagement one with another as these two surfaces 33, 43 move closer to each other in the radial direction of the drum 6. Between the surfaces 33, 43, the web 1 is interposed under tension in the machine direction M. Rotating in the machine direction M at a same circumferential velocity, the surfaces 33, 43 functions to stretch the web 1 through a step $P_1$ in which the surfaces 33, 43 come in parallel to each other, a step $P_2$ in which the surfaces 33, 43 begin to engage each other, a step $P_3$ in which the engagement further progresses, a step $P_4$ in which the engagement attains the maximum depth, a step $P_5$ in which the surfaces 33, 43 begin to move apart from each other and a step $P_6$ in which the surfaces 33, 43 are completely disengaged from each other. Referring to FIG. 5, the section $S_1$ is in the step $P_1$ in which the sharply corrugated upper plate $U_1$ and the sharply corrugated lower plate $L_1$ are spaced from each other but in parallel to each other. The section $S_2$ is in the step $P_2$ in which the drum 6 and the plate assembly 7 rotate around the shaft 8 from the state of the step $P_1$ by 30° in the machine direction M and the plate $U_2$ moves toward the plate $L_2$ so as to come in contact with the web 1 under tension. The section $S_3$ is in the step $P_3$ in which the plate $U_3$ moves downward to a level lower than the plate $U_2$ into engagement with the plate $L_3$ and the two plates $U_3$, $L_3$ begin to engage with each other so that the convex portions 31 of the plate $U_3$ cooperate with the convex portions 41 of the plate $L_3$ to press the web 1 and thereby to stretch the web 1 between each pair of the adjacent convex portions 31 as well as between each pair of the adjacent convex portions 41. The section $S_4$ is in the step $P_4$ in which the plates $U_4$, $L_4$ moves into the deepest engagement with each other. The section $S_5$ is in the step $P_5$ in which the plate $U_5$ begins to move upward and apart from the plate $L_5$. The section $S_6$ is in the step $P_6$ in which the plates $U_6$, $L_6$ are completely disengaged from each other. The web 1 stretched through these steps $P_1$-$P_6$ is kept tight in the machine direction M under the effect of the outlet nip roll pair 16. Therefore, even after released from these plates $U_6$, $L_6$, the web 1 is kept in contact with the convex portions 41 without sagging. The section $S_7$ is in the step $P_7$ in which the plate $U_7$ is moved further upward beyond the level of the plate $U_6$ and about to swing apart from the sharply corrugated lower plate $L_7$. The sections $S_8$-$S_{12}$ are respectively in the steps $P_8$-$P_{12}$ in which the sharply corrugated upper plates $U_8$-$U_{12}$ have swung apart from the associated sharply corrugated lower plates $L_8$-$L_{12}$ (See FIG. 2).

Figure 6:
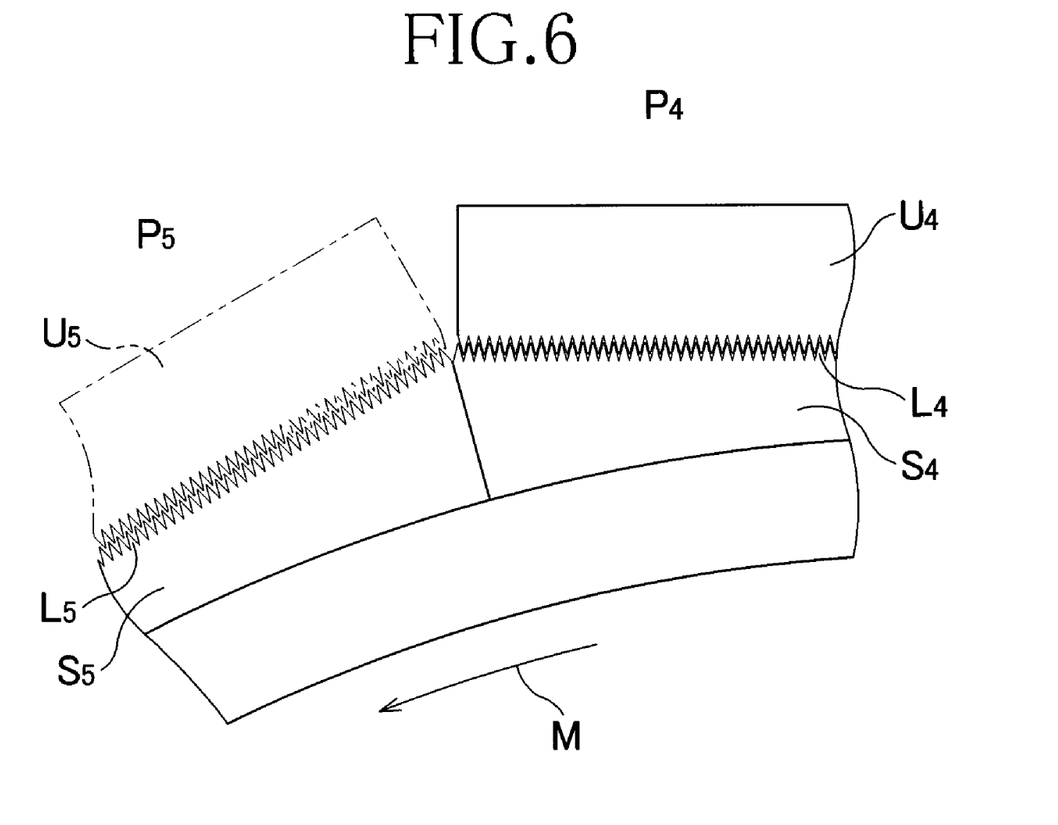
FIG. 6 A partially scale-enlarged view of the sharply corrugated upper plate and the sharply corrugated lower plate.

FIG. 6 is a diagram illustrating circumferential parts of the sharply corrugated upper and lower plate $U_4$, $L_4$ engaged with each other in the step $P_4$ as illustrated in FIG. 5. FIG. 6 further illustrates the sharply corrugated upper plate $U_5$ beginning to move upward apart the sharply corrugated lower plate $L_5$ in the step $P_5$ wherein the upper plate $U_5$ is indicated by imaginary lines. The sharply corrugated upper plate $U_5$ remains juxtaposed to the sharply corrugated upper plate $U_4$ for a short time during rotation of the drum 6 rotates in the machine direction M and then moves apart from the sharply corrugated lower plate $L_5$, i.e., the process proceeds to the step $P_5$ as illustrated in FIG. 5.

Figure 7:
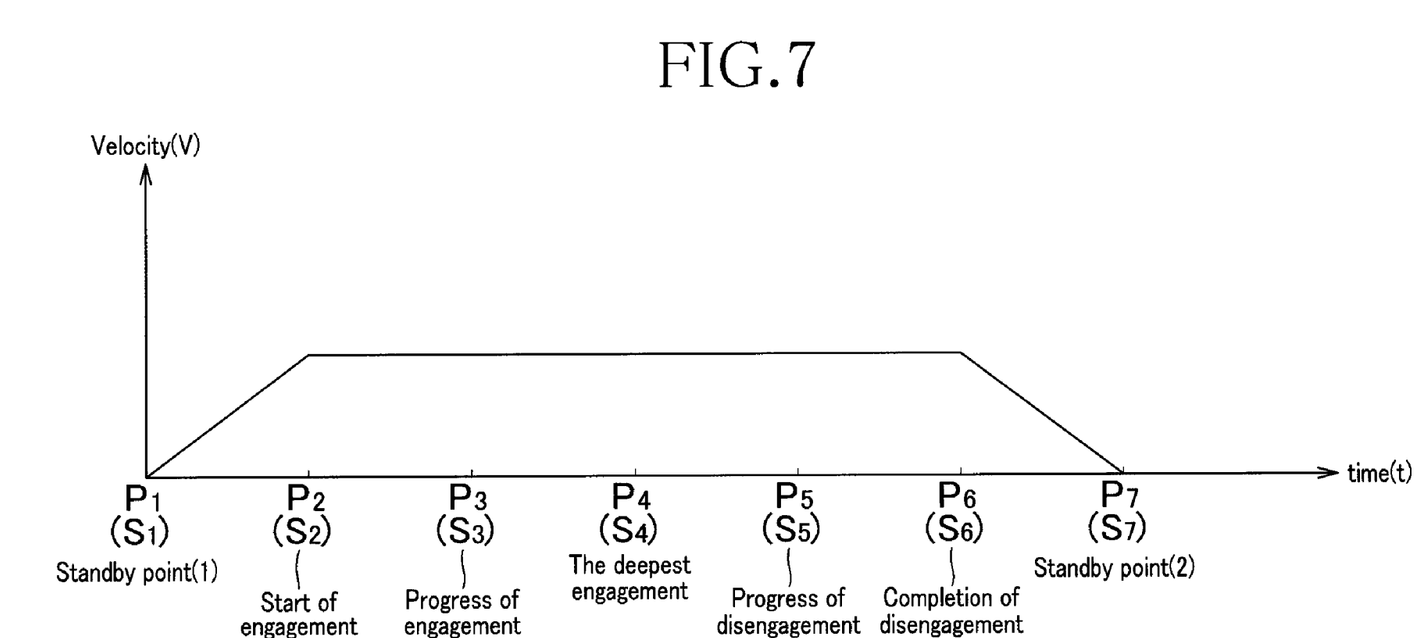
FIG. 7 A graphic diagram exemplarily illustrating the moving velocity of the sharply corrugated upper plate.

FIG. 7 is a graphic diagram exemplarily plotting a movement velocity of the sharply corrugated upper plates U in the radial direction of the drum 6 at which these upper plates U repetitively move toward and apart from the associated sharply corrugated lower plates L in the course of the steps $P_1$-$P_7$. Such movement velocity of the sharply corrugated upper plates U can be controlled by the control unit 22 operatively associated with the rotary rods 21. In the graphic diagram of FIG. 7, the ordinate axis indicates a velocity (m/min) of the sharply corrugated upper plates U in the radial direction of the shaft 8. The abscissa axis is the time axis which is represented here as the steps $P_1$-$P_7$ in association with the sections $S_1$-$S_7$ of the drum 6 at even intervals. A standby point (1) and a standby point (2) on the abscissa axis are respectively referred to a point at which the sharply corrugated upper plate U as shown in FIG. 4 has completely been swung toward the associated lower plate L and a point at which the sharply corrugated upper plate U begins to move apart from the associated lower plate L. As will be obvious from FIG. 7, the steps $P_2$-$P_4$ are of stretching the web 1 and, in this course, the movement velocity of the upper plates U is constant.

Figure 8:
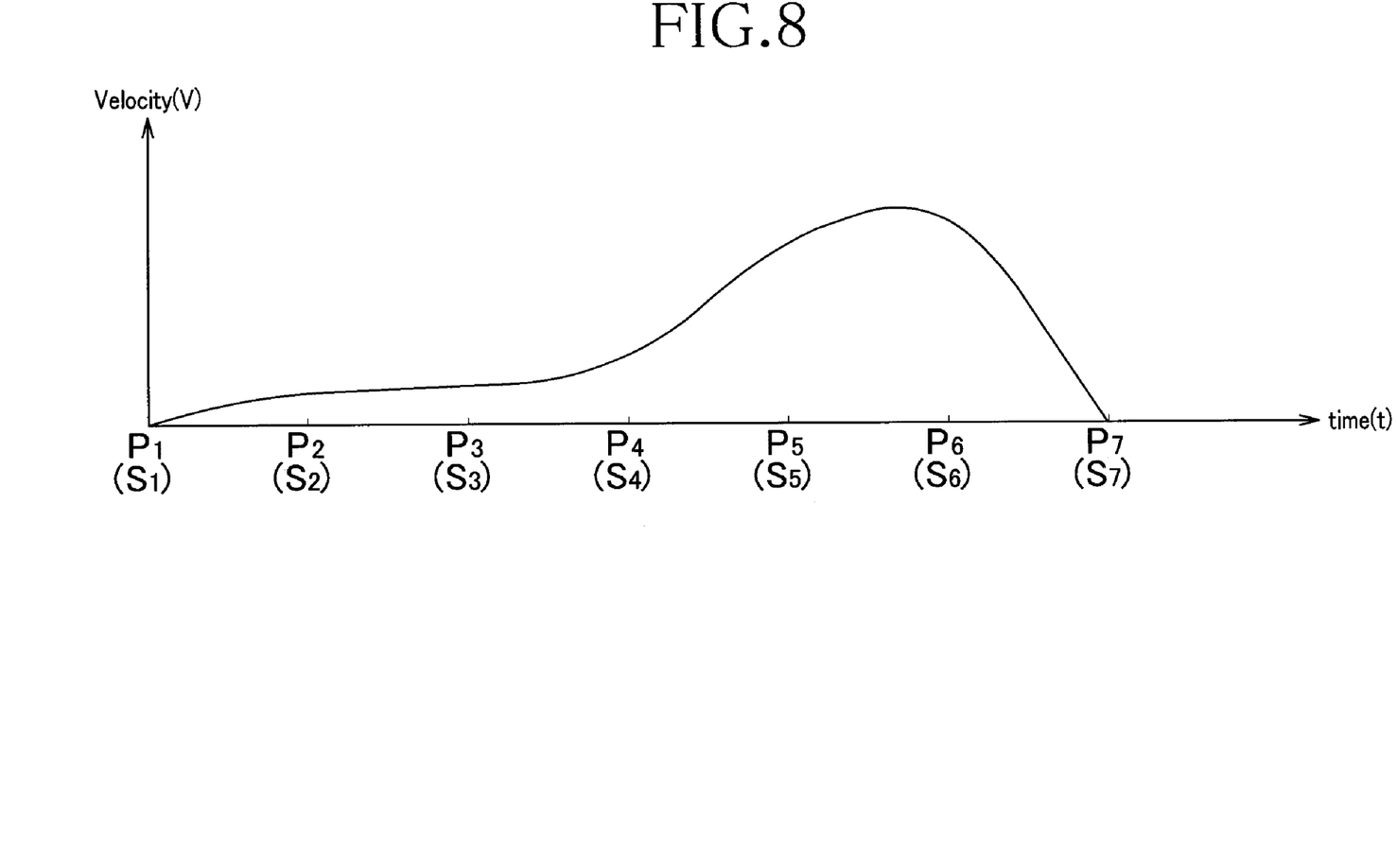
FIG. 8 A graphic diagram exemplarily illustrating the moving velocity of the sharply corrugated upper plate.

FIG. 8 also is a graphic diagram exemplarily plotting the movement velocity undergoing a change different from the case of FIG. 7. Compared to the case of FIG. 7, the movement velocity is set to a velocity significantly slow in the course of stretching the web 1, i.e., from the step in which the upper and lower plates begin to be engaged with each other to the step in which the upper and lower plates come in the deepest engagement. Such pattern of the movement velocity is effective to prevent the web 1 from being broken if the web 1 has a low tensile strength and therefore the web 1 should be broken in the course of being stretched.

Figure 9:
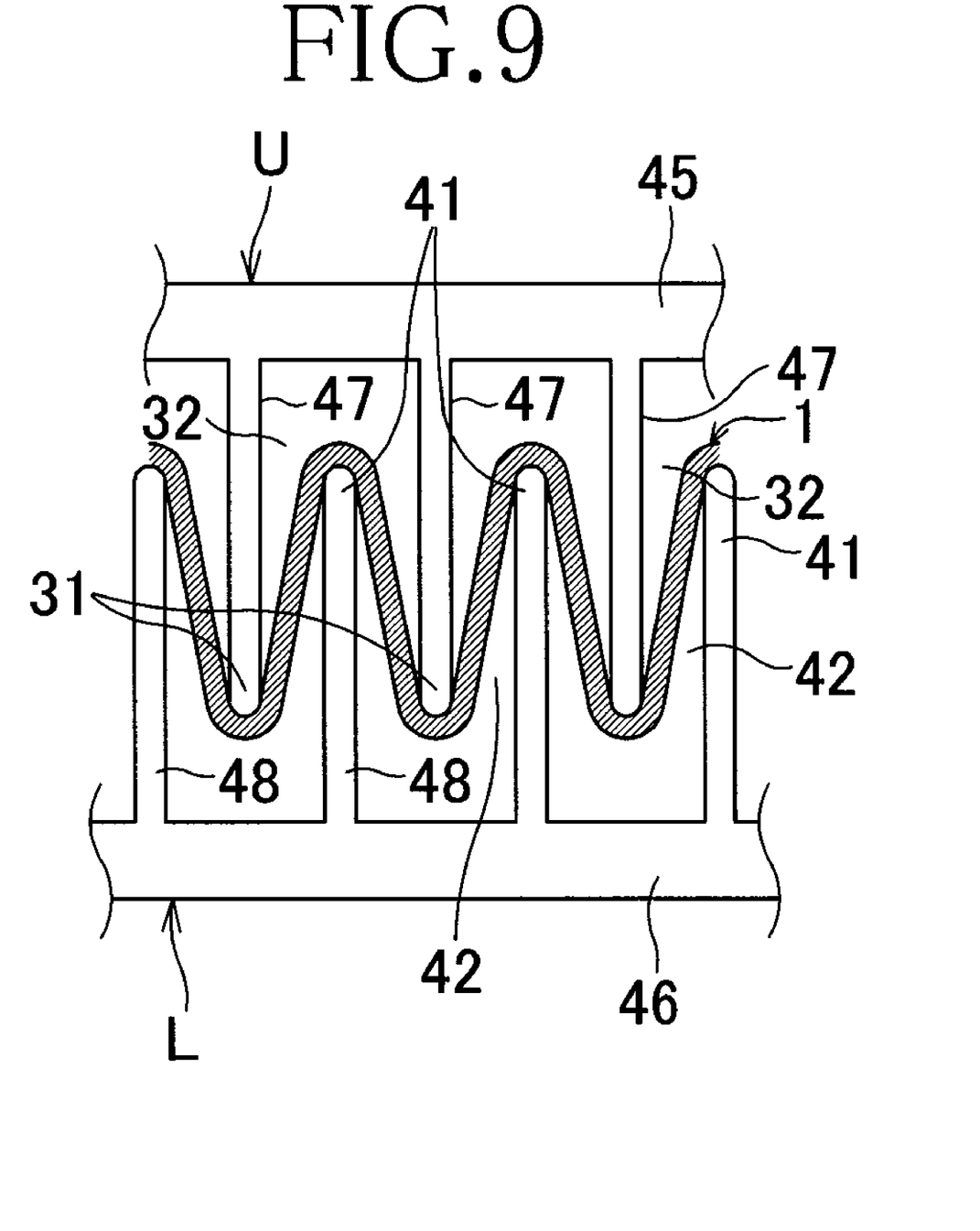
FIG. 9 A diagram exemplarily illustrating another embodiment of the sharply corrugated upper and lower plates cooperating with each other.

FIG. 9 is a diagram exemplarily illustrating the sharply corrugated upper and lower plates U, L implemented in a different manner from those of FIG. 5. These plates U, L respective comprise base plates 45, 46 and a plurality of plate-like bodies 47, 48 vertically extending from the base plates 45, 46 and having rectangular cross-sections, respectively. These plate-like bodies 47, 48 are respectively arranged at even intervals so as to define the convex portions 31, 41 while the concave portions 32 are defined between the respective pairs of the adjacent plate-like bodies 47 and the concave portions 42 are defined between the respective pairs of the adjacent plate-like bodies 48. As illustrated, the web 1 is stretched by the convex portions 34, 41 pressing the web 1 sandwiched between them from both sides. The present invention can be implemented also utilizing the sharply corrugated upper and lower plates U, L according to such embodiment.

Figure 10:
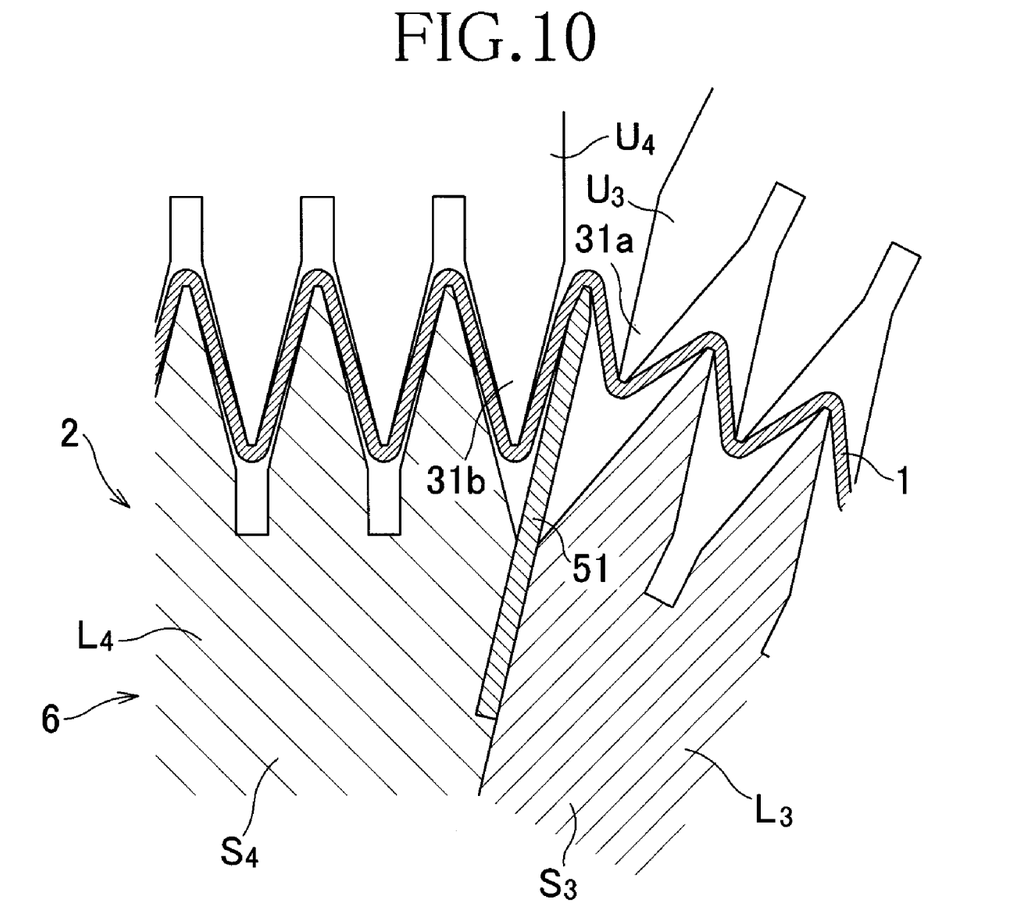
FIG. 10 A diagram exemplarily illustrating another embodiment of the sharply corrugated lower plate.

FIG. 10 is a diagram exemplarily illustrating the sharply corrugated lower plates L implemented in a different manner from that of FIG. 6. Referring to FIG. 10, a plate member 51 is provided between a pair of the adjacent the sharply corrugated lower plates $L_3$, $L_4$ in order to add the drum 6 with an additional convex portion. Specifically, the plate member 51 makes its way into a gap defined by the respective convex portions 31a, 31b of the upper plates $U_3$, $U_4$ engaged with the lower plates $L_3$, $L_4$, respectively, enabling the web 1 to be stretched between the convex portion 31a of the plate $U_3$ and the convex portion 31b of the plate $U_4$.

In the apparatus 2, both the upper plate U and the lower plate L have a dimension in the axial direction of the rotating shaft 8 longer than a width of the web 1 to be stretched and such dimensioning allows the entire width of the web 1 to be stretched at a uniform stretch ratio.

As will be obvious from the foregoing description, the apparatus 2 according to the present invention is so constructed that a plurality of the flat-bottomed sharply corrugated lower plates L arranged circumferentially on the peripheral surface of the drum 6 and a plurality of the flat-bottomed sharply corrugated upper plates U are brought into engaged with the associated lower plates L in the radial direction of the drum 6 from above. This unique construction not only facilitates the web 1 to be uniformly stretched over its full width but also facilitates the flat-bottomed plates L, U to be formed with tooth-shaped convex portions each having a desired height. Such high tooth-shaped convex portions make it easy to stretch the web 1 at the correspondingly high stretch ratio. The present invention is not limited to the embodiments as have been described above and may be implemented so that the sharply corrugated lower plates L are movable in the radial direction of the drum 6 and the sharply corrugated upper plates U are stationary.

While any particular types and/or materials of the web 1 to be processed by the apparatus 2 according to the present invention are not specified, the web 1 made of substantially inelastically stretchable fibers such as polyethylene, polypropylene or polyester may be processed by the apparatus 2 according to the present invention to obtain the resultant web 1 imparted with a permanent deformation and with a dimension longer than the initial dimension. In the case of the web 1 made of composite fibers consisting of elastically stretchable fibers such as urethane and inelastically stretchable fibers such as polyester, on the other hand, the apparatus 2 elastically stretches the urethane fibers and inelastically stretches the polyester fibers. After the web 1 has passed through this apparatus 2, the urethane fibers elastically contracts and, at the same time, the polyester fibers having already been permanently stretched creates a plurality of wrinkles due to contraction of the urethane fibers. In consequence, the web 1 becomes more bulky than before it is stretched.

The invention claimed is:

1. An apparatus adapted to stretch a web of thermoplastic synthetic resin on a peripheral surface of a drum rotating in a machine direction, said apparatus comprising:
    said peripheral surface defined by a plurality of first stretching members arranged in a circumferential direction of said drum; and
    said drum provided around its rotating shaft with rotatable members adapted to rotate in synchronization with said drum and to be rotated in said direction in which said drum rotates wherein said rotatable members are provided with the same number of second stretching members associated with said first stretching members; wherein
    said first and second stretching members associated with one another have surfaces which are opposite to each other in a radial direction of said drum and defined by convex portions and concave portions extending in parallel to said shaft and alternately arranged in said circumferential direction of said drum in a complementary fashion to each other so that said surfaces of said first and second stretching members may be engaged with and disengaged from each other; and
    at least one of said first stretching member and said second stretching member is movable in said radial direction so that said first and second stretching members sandwiching said web are capable of being engaged with each other.

2. The apparatus according to claim 1, wherein an inlet nip roll pair adapted to introduce said web between said first and second stretching members is disposed on upstream side of said drum as viewed in said machine direction and an outlet nip roll pair adapted to discharge said web from between said first and second stretching members is disposed on downstream side of said drum as viewed in said machine direction and wherein circumferential velocities of these roll pairs and said drum are able to be successively increased in the order of said inlet nip roll pair, said drum and said outlet nip roll pair.

3. The apparatus according to claim 1, wherein said first and second stretching members comprise flat-bottomed plates adapted to be parallel overlapped in engagement with each other.

* * * * *